United States Patent [19]
Le Clezio

[11] Patent Number: 5,454,432
[45] Date of Patent: Oct. 3, 1995

[54] IMPLEMENT CONTROL SYSTEM

[75] Inventor: Yvon Le Clezio, Beauvais, France

[73] Assignee: Massey Ferguson S.A., Beauvais, France

[21] Appl. No.: 129,583

[22] Filed: Sep. 30, 1993

[30] Foreign Application Priority Data

Oct. 1, 1992 [GB] United Kingdom ............. 9220732

[51] Int. Cl.[6] .................................. A01B 63/112
[52] U.S. Cl. ............... 172/7; 172/3; 172/9; 364/424.07
[58] Field of Search ................. 172/3, 7, 9, 10, 172/11, 12, 1, 2; 364/424.07

[56] References Cited

U.S. PATENT DOCUMENTS

| | | | |
|---|---|---|---|
| 4,508,176 | 4/1985 | Wiefardt et al. | 172/7 |
| 4,518,044 | 5/1985 | Wiegardt et al. | 172/7 |
| 4,518,045 | 5/1985 | Nelson | 172/7 |
| 4,582,141 | 4/1986 | Van der Lely | 172/7 X |
| 4,796,712 | 1/1989 | Rutkowski et al. | 172/7 |
| 4,807,136 | 2/1989 | Rutkowski et al. | 172/7 X |
| 4,969,527 | 11/1990 | Boe et al. | 172/7 |

FOREIGN PATENT DOCUMENTS

| | | |
|---|---|---|
| 092316 | 10/1983 | European Pat. Off. . |
| 151325 | 8/1985 | European Pat. Off. . |
| 2093676 | 9/1982 | United Kingdom . |
| 2252645 | 8/1992 | United Kingdom . |

*Primary Examiner*—Randolph A. Reese
*Assistant Examiner*—Robert Pezzuto
*Attorney, Agent, or Firm*—MacMillan, Sobanski & Todd

[57] ABSTRACT

An implement control system includes desired draft force setting apparatus and draft force sensing apparatus providing a draft force signal. It also includes engine speed sensing apparatus arranged to provide an engine speed signal of the same form as the draft force signal. The draft force signal and engine speed signal are averaged and compared with the set desired draft force to produce an error signal which is used to control the movement of the implement. The system is particularly suitable for the control of engine driven implements such as stone-breakers and rotivators where it prevents the engine stalling under heavy load, it is, however, suitable for use with fully-mounted, semi-mounted and trailed implements.

19 Claims, 4 Drawing Sheets

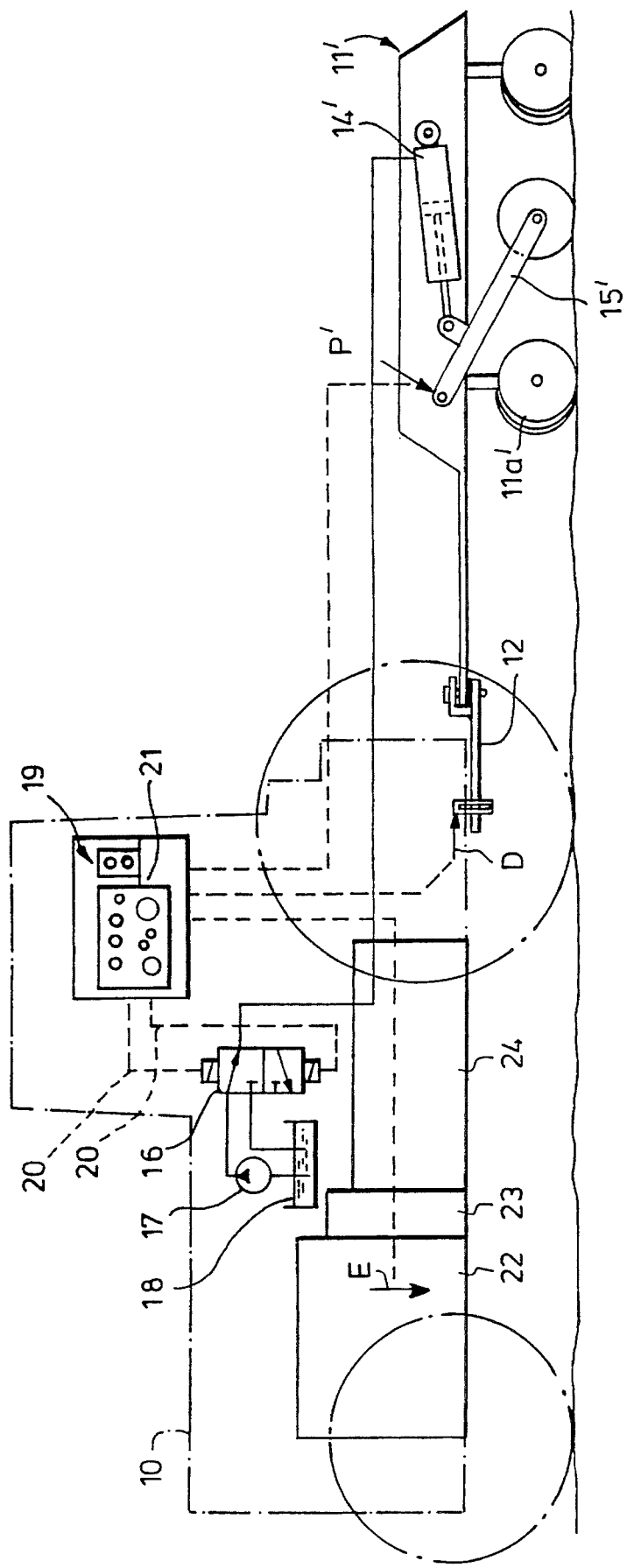

IMPLEMENT CONTROL SYSTEM

BACKGROUND OF THE INVENTION

The invention relates to a control system for an implement, in particular for an implement of the sort mounted on or trailed by agricultural tractors.

It is an object of the invention to provide an improved implement control system.

It is a further object of the invention to provide an improved method of controlling an implement.

It is yet a further object of the invention to provide a kit of parts for converting a known implement control system into a system according to the invention.

SUMMARY OF THE INVENTION

Thus in accordance with a first aspect of the present invention there is provided an implement control system including:
- desired draft force signal setting means;
- draft force sensor means arranged to provide a draft force signal;
- engine speed sensing means arranged to provide an engine speed signal;
- conversion means arranged to convert the draft force signal and/or the engine speed signal so that the draft force and engine speed signals are of the same form;
- averaging means arranged to average the draft force and engine speed signals;
- comparison means arranged to compare the averaged signal with the set desired draft force signal to produce an error signal;

wherein the control system, in response to the error signal, commands a raise/lower means to move the implement so as to tend to reduce the error signal to zero.

The present invention provides the advantage that the implement is controlled in dependence on both draft force and engine speed thus preventing the vehicle engine from being stalled if very heavy work is encountered by the implement.

Preferably the system also includes a means for adjusting the sensitivity with which the system responds to changing conditions. In addition the system may also include implement position sensor means and means by which the sensed position of the implement may be mixed with the draft force and engine speed signals and thus influence the control of the implement.

In accordance with a second aspect of the invention there is provided a method of controlling an implement including the steps of:
(i) setting a desired draft force signal;
(ii) sensing actual draft force to provide a draft force signal;
(iii) sensing engine speed to provide an engine speed signal;
(iv) converting the draft force and/or engine speed signals as necessary such that they are of the same form;
(v) averaging the draft force and engine speed signals to produce an averaged signal;
(vi) comparing the averaged signal with the set desired draft force signal to produce an error signal, and
(vii) moving the implement so as to tend to reduce the error signal to zero.

Preferably the method will also include the step of adjusting the sensitivity of the control of the implement.

In accordance with a third aspect of the invention there is provided a kit of parts for conversion, to a control system in accordance with the first aspect of the invention, of an implement control system which operates to control the implement in response to the output signals from two draft force sensors by averaging them, comparing the average with a desired value to generate an error and moving the implement such that the error tends to reduce, the kit including:
- activation means for activating a heavy work mode of the converted system;
- indicator means for indicating when the heavy work mode is activated;
- control means for controlling input signals to the implement control system as appropriate for the operative mode;
- conversion means for converting engine speed signals from engine speed sensor means to the same form as draft force signals from the draft force sensors; and
- connection means arranged to connect:
  - the engine speed sensor means to the conversion means; and
  - the activation means, indicator means, conversion means, and a draft force sensor means to the control means.

The control system of the present invention is particularly suitable for the control of stone-breakers and rotavators which are fully mounted implements driven by the tractor power-take-off. It is, however, of use with non-powered implements and in such use offers the advantage that it responds to changing conditions faster than a implement control system using only draft force and position measurements. The control system is also of use with semi-mounted and trailed implements in addition to fully mounted implements.

BRIEF DESCRIPTION OF THE DRAWINGS

The present invention will now be described by way of example only, with reference to the accompanying drawings in which:

FIG. 4 is a schematic view of a tractor and trailed implement combination fitted with a control system according to the present invention.

DETAILED DESCRIPTION OF THE PREFERRED EMBODIMENT

Figure 1:
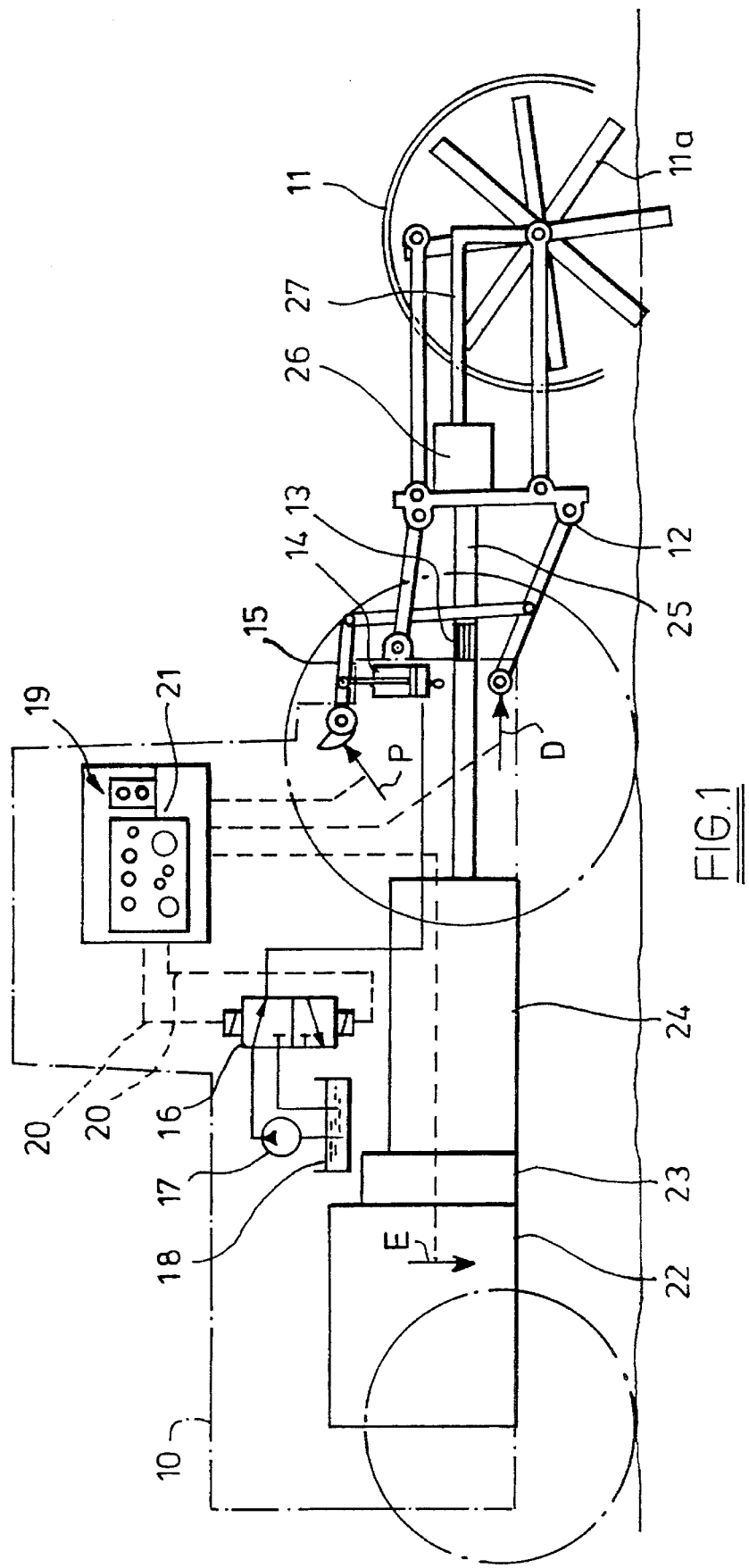
FIG. 1 is a schematic view of a tractor and fully-mounted implement combination fitted with a control system according to the present invention.

Referring to FIG. 1, this shows schematically a tractor 10 and an implement in the form of a stone-breaker 11. The stone-breaker 11 is mounted on the tractor 10 via a conventional 3-point linkage 12, and is powered by connection to the conventional rear power-take-off (PTO) 13 of the tractor. The stone-breaker 11 is a form of rotavator with flails 11a which break up the earth and stones.

The linkage 12 is raised and lowered relative to the tractor, and with it the implement 11, by a pair of lift cylinders 14 which act between lift arms 15 and the rear of the tractor chassis. A solenoid operated control valve 16 is mounted on the tractor 10 and controls the supply of pressurised fluid to and exhaust of fluid from the cylinders 14. Pressurised fluid is supplied to the valve by pump 17 from a reservoir 18 to which fluid is returned when exhausted from valve 16.

The operation of control valve 16 is controlled by an electronic control means 19 which is mounted on the tractor. The electronic control means 19 is connected to the valve 16 via lines 20 and issues signals to the valve 16 to control the movement of the cylinders 14 and therefore the position of the linkage 12 and stone-breaker 11 relative to the tractor 10. The electronic control means 19 receives inputs from right and left lower link draft force sensors D, a position sensor P and an engine speed sensor E. Operation of the control means 19 is performed via control panel 21 which is described in greater detail below and illustrated schematically in FIG. 2.

The rear PTO 13 of the tractor 10 is powered from engine 22 via clutch 23 and transmission 24. The connection to the PTO 13 employs a shaft 25, which connects the power to an implement gearbox 26, which in turn powers an implement drive shaft 27, which drives the flails 11a.

Figure 2:
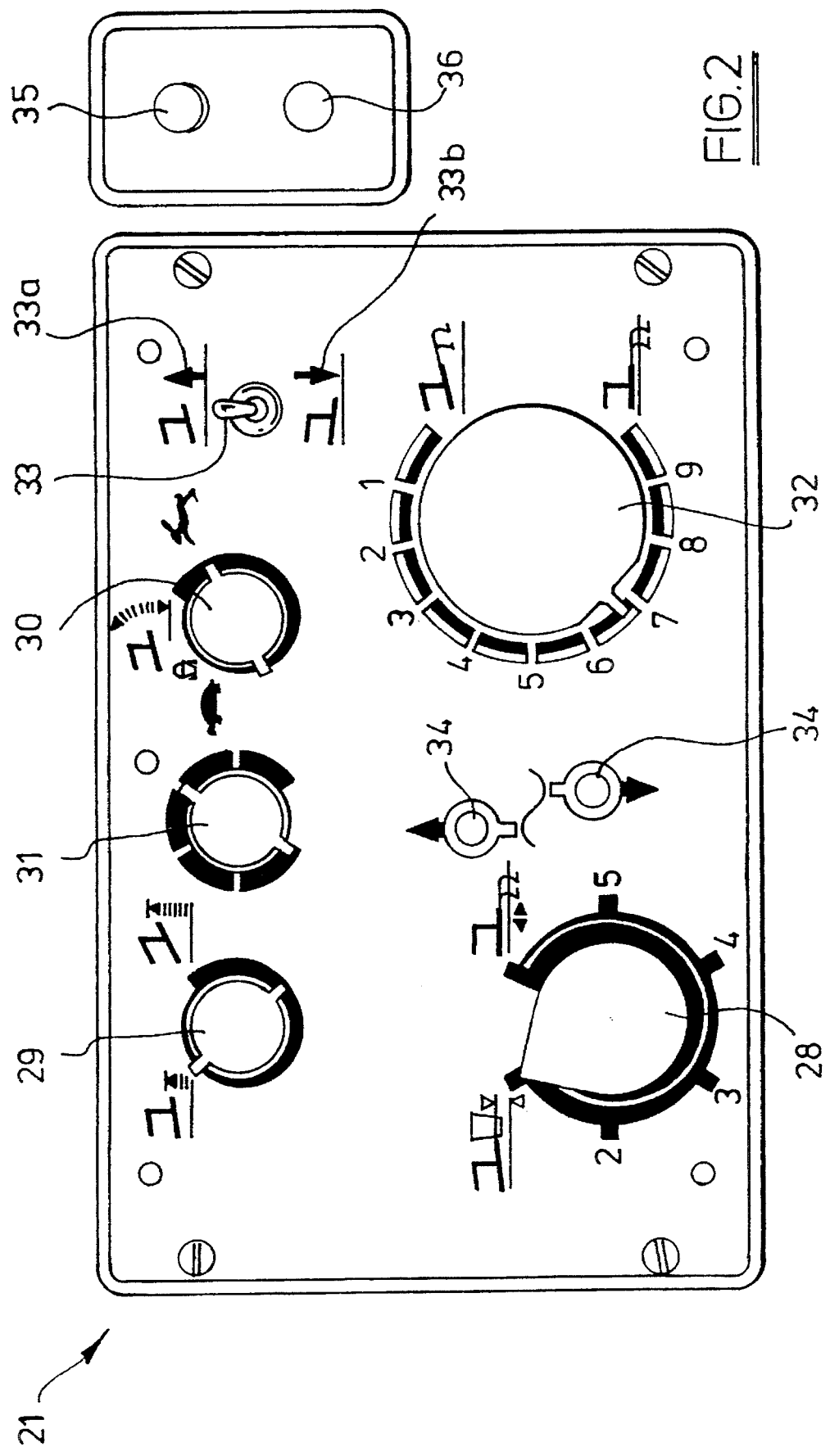
FIG. 2 schematically illustrates the control panel of the system.

Referring now to FIG. 2, the operation of the control system and thus the control of the stone-breaker 11 will be described with reference to the control panel 21 illustrated in FIG. 2.

Rotary knob 28 is used to select whether the control system is to operate in pure position control mode at unmarked knob position 1, or in pure draft control mode at unmarked position 6 at the other end of the range of rotation of the knob. The intermediate marked knob positions 2, 3, 4 and 5 are used to select different proportions of intermix when the system operates primarily in response to the draft force signals but with some dependence on the position signal from sensor P. Such operation is well known.

Rotary knob 29 is used to control the maximum height to which the 3-point linkage 12 may be raised. It is necessary to be able to vary this height for different implements since on certain implements some parts might otherwise penetrate the rear window of the cab when the linkage is raised.

Rotary knob 30 is used to control the rate at which the 3-point linkage falls when the system is commanded to lower the implement.

Rotary knob 31 is used to control the sensitivity of the system, from a lower sensitivity position to a higher sensitivity position.

Large rotary knob 32 is used, dependent on the mode of operation of the system, to set either a desired position signal or a desired draft force signal which the control system will try to maintain.

A main, two position switch 33 is used to command raising of the implement when moved to its upper position, as indicated in legend 33a, and to command lowering of the implement when moved to its lower position as indicated in legend 33b. Indicator lights 34 are illuminated appropriately to indicate to the driver whether the implement is raised or lowered.

Figure 3:
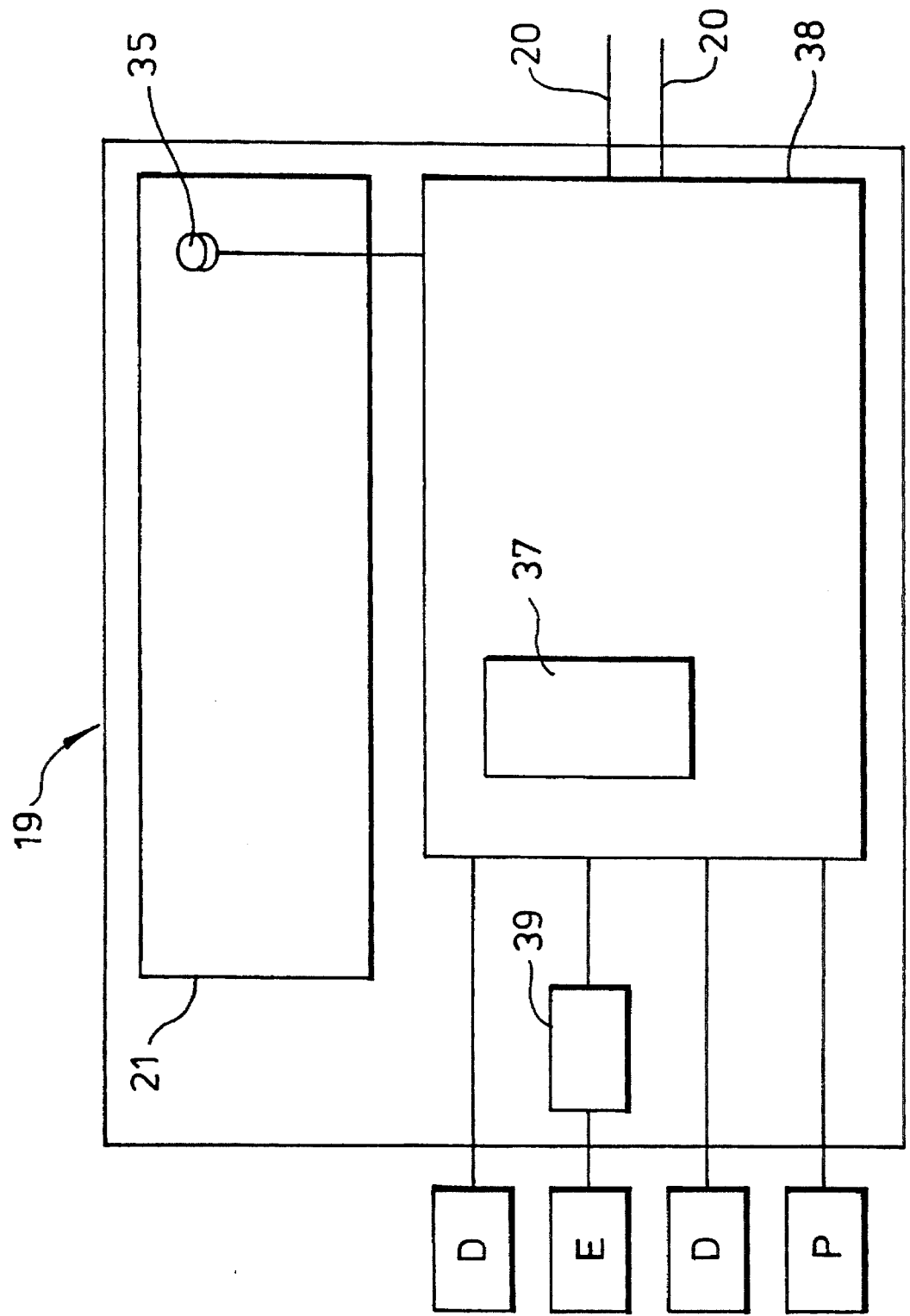
FIG. 3 shows a diagrammatic representation of the electronic control system.

A second switch 35, which generates a pulse when operated, is used to select a heavy work mode when this is required. The system will only respond to use of switch 35 and allow selection of the heavy work load when the implement is lowered ready for use. In normal use the system operates in a standard work mode in which the electronic control system accepts the inputs from the right and left lower link draft force sensors D and the position sensor P and operates in response to the draft force signals, the position signal or both if intermix is selected. In the heavy work mode the electronic control system accepts the inputs from the left lower link draft force sensor D, the position sensor P and the engine speed sensor E. Indicator light 36 is illuminated when the heavy work mode is operative. The selection of the heavy work mode is automatically cancelled when the implement is raised using main switch 33. The manner of operation of the implement control system in the two modes is described below with reference to FIG. 3.

In the standard work mode (indicator light 36 off) the input signals from the right and left lower link draft force sensors are averaged in averaging unit 37 of control system 19. In draft control mode the resulting averaged draft force signal is compared in the main processing unit 38 of the control unit 19 with the set draft force signal to generate a draft force error. The draft force error signal is used, in combination with the input signal from the position sensor P if intermix is selected, to control the implement in a known manner. If the system is in position control mode the draft force signals are not used, the position signal from sensor P being compared with the set position signal from knob 32 and a position error signal being generated and used to control the implement in a known manner.

The heavy work mode may only be used in conjunction with draft control mode, with or without intermix, it is not appropriate for use with position control mode. In the heavy work mode (indicator light 36 on) the input signals from the left lower draft force sensor and the engine speed sensor are used, the signal from the right lower link draft force sensor having been replaced by the signal from the engine speed sensor. However, before the left draft force signal and engine speed signal can be averaged the two signals must be of the same form. That is they must have the same range of possible values and vary in the same way with changes in the measured parameter.

The engine speed signal generated by the sensor E is a digital signal giving a TTL compatible signal image of the engine speed. The lower link draft force sensors D produce analogue signals whereby the voltage varies with the draft force. For the signals to be compatible the engine speed signal under goes a frequency to voltage conversion in conversion unit 39. The exact form of the conversion is set during manufacture such that, for example, the converted signal has an amplitude of 5 volts at 2000 rpm.

The left lower link draft force signal and the converted engine speed signal are then averaged in averaging unit 37 of the main processor 38. The resulting averaged signal is compared with the set draft force signal, in main processing unit 38, to generate an error signal. The error signal is used, in combination with the position signal if intermix is selected, to control the implement such that the error signal tends to reduce in magnitude.

Thus in heavy work mode the implement is controlled in dependence on a combination of draft force and engine speed, and were intermix is selected in dependence on position too. The incorporation of engine speed prevents the tractor engine speed from reducing excessively when a patch of ground causing particularly hard work is encountered. In particular it prevents stalling of the tractor engine. With the sensitivity set at its highest level, i.e. responding to changes as small as 10 rpm the engine speed can be prevented from drifting by more than plus or minus 20 rpm. With the sensitivity set at its lowest level the engine speed is controlled to within approximately plus or minus 200 rpm.

In the example above, where two draft force sensors used for standard control modes are located to the left and right of the implement linkage and one of these is effectively replaced by the engine speed sensor for the heavy work mode, the heavy work mode is ideally only for use with implements which exert a symmetrical force on the implement linkage. However, other systems according to the invention with differently located draft force sensors, or where the engine speed signal is provided as an additional input, and does not replace another input when heavy work mode is selected, may be constructed such that the heavy work mode is appropriate for use with other implements.

The system is suitable for use with non-powered implements, fully-mounted, semi-mounted and trailed, as well as powered implements. An example of such use with a trailed implement is shown in FIG. 4 where a disc-harrow 11' with discs 11a', is shown trailed by means of a drawbar 12'. The disc-harrow may be raised and lowered relative to the ground by means of a cylinder 14' mounted on the harrow and acting on a wheel support 15'. The supply of hydraulic fluid to and exhaust of fluid from the cylinder 14' is controlled by the valve 16 as before.

The drawbar 12' is connected to the left lower draft force sensor D in a known manner. A position sensor P' is located on the harrow to monitor the cylinder 14' and thus the harrow position. Thus operation of the system is as described above for the mounted implement 11 with the exception that it is only the implement 11' which is raised and lowered and not the 3-point linkage 12 and the implement 11.

A kit of parts may be supplied to convert a standard implement control system using two draft force signals which are averaged and one or more position signals into a system according to the invention. If the vehicle to which the kit is to be fitted already includes an engine speed sensor for use in other control systems the kit would include the following parts:

— an activation switch and an indicator light;
— a heavy work mode control unit;
— a conversion unit to convert the engine speed signal to the same form as the draft force signals;
— wiring to connect the engine speed sensor to the conversion unit, and wiring to connect the conversion unit, one of the draft force sensors, the activation switch, an indicator light and the implement control system main implement raise/lower switch to the control unit.

I claim:

1. A system for controlling a working position of an implement carried by an engine driven vehicle comprising:
   means for generating a signal which is representative of an actual draft force experienced by the implement during use;
   means for generating a signal which is representative of a speed of the engine;
   means responsive to said actual draft force signal and said engine speed signal for generating a signal which is representative of the average thereof;
   means for generating a signal which is representative of a desired draft force;
   means responsive to only said average signal and said desired draft force signal for generating an error signal which is representative of the difference therebetween; and
   means responsive to said error signal for controlling the working position of the implement to as to tend to reduce said error signal to a minimum value.

2. The system defined in claim 1 wherein said means for generating a signal which is representative of the actual draft force produces an analog actual draft force signal and said means for generating a signal which is representative of the speed of the engine produces a digital engine speed signal.

3. The system defined in claim 2 further including a converter for converting said digital engine speed signal to an analog engine speed signal.

4. The system defined in claim 3 wherein said means for generating said average signal produces a signal which is the average of said analog engine speed signal and said analog draft force signal.

5. The system defined in claim 3 wherein said converter is a frequency to voltage converter.

6. The system defined in claim 5 wherein said analog draft force signal is a voltage signal.

7. A method for controlling the working position of an implement carried by an engine driven vehicle comprising:
   (a) generating a signal which is representative of the actual draft force experienced by the implement during use;
   (b) generating a signal which is representative of the speed of the engine;
   (c) generating a signal which is representative of the average of said actual draft force signal and said engine speed signal;
   (d) generating a signal which is representative of a desired draft force;
   (e) generating an error signal which is representative of only the difference between said average signal and said desired draft force signal; and
   (f) controlling the working position of the implement in response to said error signal so as to tend to reduce said error signal to a minimum value.

8. The method defined in claim 7 wherein said step of generating a signal which is representative of the actual draft force produces an analog actual draft force signal and said step of generating a signal which is representative of the speed of the engine produces a signal engine speed signal.

9. The method defined in claim 8 further including the step of converting the digital engine speed signal to an analog engine speed signal.

10. The method defined in claim 9 wherein said step of generating said average speed produces a signal which is the average of the analog engine speed signal and the analog actual draft force signal.

11. The method defined in claim 9 wherein said step of converting employs a frequency to voltage converter.

12. The method defined in claim 11 wherein the analog draft force signal is generating as a voltage signal.

13. An engine driven tractor for carrying an implement and having a system for controlling a working positron of the implement, said tractor comprising:
   a three point linkage adapted to mount the implement thereon, said linkage having a first lower link and a second lower link;
   means for generating a signal which is representative of an actual draft force experienced by said first lower link of the implement during use;
   means for generating a signal which is representative of an actual draft force experienced by said second lower link of the implement during use;

means for generating a signal which is representative of a speed of the engine;

means for for generating a signal which is representative of the average of said first lower link draft force signal and one of said engine speed signal sand said second lower link actual draft force signal;

means for generating a signal which is representative of a desired draft force;

means responsive to said average signal and said desired draft force signal for generating an error signal which is representative of the difference therebetween; and means responsive to only said error signal for controlling the working portion of the implement so as to tend to reduce said error signal to a minimum value.

14. The engine driven tractor defined in claim 13 further including means for selectively feeding one of said engine speed signal and said second link draft force signal to said means for generating said average signal.

15. The engine driven tractor defined in claim 14 wherein said means for generating a signal which is representative of the first lower link actual draft force produces an analog first lower link actual draft force signal and said means for generating a signal which is representative of the speed of the engine produces a digital engine speed signal.

16. The system defined in claim 15 further including a converter for converting said digital engine speed signal to an analog engine speed signal.

17. The system defined in claim 16 wherein said means for generating said average signal produces a signal which is the average of said analog engine speed signal and said analog first lower link actual draft force signal.

18. The system defined in claim 16 wherein said converter is frequency to voltage converter.

19. The system defined in claim 18 wherein said first lower link analog draft force signal is a voltage signal.

* * * * *

UNITED STATES PATENT AND TRADEMARK OFFICE
CERTIFICATE OF CORRECTION

PATENT NO. : 5,454,432
DATED : October 3, 1995
INVENTOR(S) : Yvon Le Clezio It is certified that error appears in the above-identified patent and that said Letters Patent is hereby corrected as shown below:

Column 6, Claim 1,  Line 5,  after "implement", change "to" to -- so --.
Column 6, Claim 4,  Line 16. before "draft", insert -- actual --.
Column 6, Claim 8,  Line 45, after "a", change "signal" to -- digital --.
Column 6, Claim 10, Line 50, after "average", change "speed" to --signal --.
Column 6, Claim 12, Line 56, after "is", change "generating" to -- generated --.
Column 6, Claim 13, Line 57, after "working", change "positron" to -- position --.
Column 7, Claim 13, Line 5,  after "means", change "for for" to -- for --.
Column 7, Claim 13, Line 7,  after "signal", change "sand" to -- and --.
Column 7, Claim 13, Line 21, after "to", insert -- only --.
Column 7, Claim 13, Line 14, after "to", delete "only".
Column 7, Claim 13, Line 15, after "working", change "portion" to -- position --.
Column 8, Claim 18, Line 16, after "is", insert -- a --.

Signed and Sealed this

Thirtieth Day of January, 1996

*Attest:*

BRUCE LEHMAN

*Attesting Officer*   *Commissioner of Patents and Trademarks*